United States Patent
Kurokawa et al.

(10) Patent No.: US 10,017,387 B2
(45) Date of Patent: Jul. 10, 2018

(54) BORON NITRIDE FINE PARTICLES AND PRODUCTION METHOD THEREOF

(71) Applicants: DENKA COMPANY LIMITED, Tokyo (JP); NATIONAL INSTITUTE FOR MATERIALS SCIENCE, Tsukuba-shi, Ibaraki (JP)

(72) Inventors: Fumihiro Kurokawa, Omuta (JP); Seitaro Kobayashi, Omuta (JP); Takashi Kawasaki, Machida (JP); Go Takeda, Machida (JP); Yoshio Bando, Tsukuba (JP); Dmitri Golberg, Tsukuba (JP)

(73) Assignees: DENKA COMPANY LIMITED, Tokyo (JP); NATIONAL INSTITUTE FOR MATERIALS SCIENCE, Tsukuba-shi, Ibaraki (JP)

( * ) Notice: Subject to any disclaimer, the term of this patent is extended or adjusted under 35 U.S.C. 154(b) by 0 days.

(21) Appl. No.: 15/117,878

(22) PCT Filed: Feb. 9, 2015

(86) PCT No.: PCT/JP2015/053488
§ 371 (c)(1),
(2) Date: Aug. 10, 2016

(87) PCT Pub. No.: WO2015/122378
PCT Pub. Date: Aug. 20, 2015

(65) Prior Publication Data
US 2017/0008767 A1    Jan. 12, 2017

(30) Foreign Application Priority Data
Feb. 12, 2014 (JP) .................................. 2014-024008

(51) Int. Cl.
*C01B 21/064*    (2006.01)

(52) U.S. Cl.
CPC ...... *C01B 21/0646* (2013.01); *C01P 2004/61* (2013.01); *C01P 2004/62* (2013.01); *C01P 2004/64* (2013.01); *C01P 2006/80* (2013.01)

(58) Field of Classification Search
CPC .................... C01B 21/0646; C01P 2004/62
See application file for complete search history.

(56) References Cited

U.S. PATENT DOCUMENTS 5,854,155 A    12/1998    Kawasaki et al.
2012/0196128 A1    8/2012    Gohara et al.

FOREIGN PATENT DOCUMENTS

EP    2487134 A1    8/2012
JP    H04-42897 A    2/1992
(Continued)

OTHER PUBLICATIONS

PCT, "International Search Report for International Application No. PCT/JP2015/053488".
(Continued)

*Primary Examiner* — Alexandre F Ferre
(74) *Attorney, Agent, or Firm* — Manabu Kanesaka

(57) ABSTRACT

A boron nitride fine particle has low major diameter/thickness (aspect) ratio, high purity and high crystallinity, and also has an average particle diameter of 0.05 to 2.0 μm, a graphitization index of 3 or less, and a total oxygen content of 0.20% by mass or less, with an average value of a major diameter/thickness ratio of scaly particles being 6.0 or less. A method of producing a boron nitride fine particle includes introducing ammonia and an alkoxide borate at an ammonia/alkoxide borate molar ratio of 1 to 5 in a reaction vessel in an inert gas atmosphere for heating at 800 to 1,350° C. within 30 seconds thereby obtaining a boron nitride precursor, and then heating the boron nitride precursor at 1,650 to 2,200° C. for at least 0.5 hour in an inert gas atmosphere.

2 Claims, 2 Drawing Sheets

(56) References Cited

FOREIGN PATENT DOCUMENTS

| JP | H08-290905 A | 11/1996 |
| JP | H10-067507 A | 3/1998 |
| JP | 2000-0327312 A | 11/2000 |
| JP | 2004-182572 A | 7/2004 |
| JP | 2008-266101 A | 11/2008 |
| JP | 2010-076955 A | 4/2010 |
| JP | 2010-180066 A | 8/2010 |

OTHER PUBLICATIONS

Non-Patent Publication: ChengChun Tang et al., Advanced Functional Materials, 2008, 18, pp. 3653-3661.
Europe Patent Office, "Search Report for European Patent Application No. 15749060.8," Oct. 10, 2017.

BORON NITRIDE FINE PARTICLES AND PRODUCTION METHOD THEREOF

RELATED APPLICATIONS

The present application is National Phase of International Application No. PCT/JP2015/053488 filed Feb. 9, 2015, and claims priority from Japanese Application No. 2014-024008, filed Feb. 12, 2014, the disclosure of which is hereby incorporated by reference herein in its entirety.

FIELD OF THE INVENTION

The present invention relates to a scaly boron nitride fine particle well suited for use as a highly thermoconductive filler or the like, and a production method thereof.

BACKGROUND ART

Hexagonal boron nitride (hereinafter called "boron nitride"), because of having lubrication capability, high thermal conductivity, insulation capability and so on, are now widely used as releasing agents for solid lubricants, molten glasses and aluminum or the like as well as fillers for thermal radiation materials.

To be compatible with higher performances of recent computers and electronic hardware in particular, measures against thermal radiation have increased in importance, and attention has been directed to the high thermal conductivity of boron nitride.

In recent years, it has been studied to add boron nitride to the resin layers of printed wiring boards and flexible copper-clad laminated sheets for the purpose of imparting high thermal conductivity and insulation to them.

While generally available boron nitride has an average particle diameter of a few μm to 20 μm, some resin substrates for printed wiring boards and flexible copper-clad laminated sheets have a thickness of the order of several tens μm, and large average particle diameters of boron nitride result in poor dispersability in resins, failing to obtain smooth surfaces, or with that boron nitride dispersed, there are hard spots appearing, often making it impossible to keep the strength of the resin layer high. For these reasons, there is mounting demand for boron nitride fine particles of the submicron order (0.1 μm).

To have high thermal conductivity, the boron nitride must be of high purity (low total impurity or oxygen content in particular) and high crystallinity, and the same goes for boron nitrite fine particles of the submicron order (0.1 μm).

On the other hand, the boron nitride, because of its characteristic scaly shape, is less capable of dispersion in a resin.

To improve the dispersability of inorganic powders such as boron nitride in resins, surface treatment using a silane coupling agent or the like is usually effective.

However, such surface treatment was often ineffective for boron nitride because of the presence of surface functional groups on its end surface alone.

It follows that if thick, scaly, submicron-order boron nitride fine particles having a large end surface area are obtained, they will be preferable for addition to the aforesaid resin layer.

The boron nitride is generally obtained by reactions at high temperatures between a boron source (boric acid, borax, etc.) and a nitrogen source (urea, melamine, ammonia, etc.).

However, most of boron nitride obtained by this method aggregates into an average particle diameter of a few μm to 20 μm; in order to obtain boron nitride of the submicron order, it is required to prepare boron nitride by disintegration of boron nitride obtained by the aforesaid method or by a method different from the aforesaid method.

Referring how to disintegrate boron nitride, there is a report about disintegration using a jet mill or the like (Patent Publication 1).

With these methods, however, an active surface appearing during pulverization is so extremely susceptible to oxidation with the result that the obtained boron nitride fine particles will have a high total oxygen content.

A metal foil-clad sheet using boron nitride powders having improved dispersability has also been proposed in the art (Patent Publication 2). This patent publication refers to the use of boron nitride having an average primary particle diameter of 0.2 to 4 μm, an aspect ratio of 2 to 30 and an oxygen concentration of 0.1 to 1% by weight, but the specifically mentioned boron nitride has an aspect ratio of 7.3 or greater and an oxygen concentration of 0.25% by weight or higher. Patent Publication 2 says nothing about the graphitization index, and is silent about any boron nitride having an average particle diameter of 0.05 to 2.0 μm, a graphitization index of 3 or less, a total oxygen content of 0.20% by mass or less and an aspect ratio of 6.0 or less.

Referring to the preparation of boron nitride fine particles by a method different from the aforesaid one, there have been reports about how to obtain boron nitride fine particles by a gas-phase synthesis process (Patent Publications 3, 4 and 5).

However, boron nitride fine particles obtained by these methods, because of having low crystallinity and a high total oxygen content, is found to be less than satisfactory in terms of boron nitride's characteristics: lubrication capability and high thermal conductivity.

PRIOR ARTS

Patent Publications

Patent Publication 1: JP(A) 10-067507
Patent Publication 2: JP(A) 2010-076955
Patent Publication 3: JP(A) 2000-327312
Patent Publication 4: JP(A) 2004-182572
Patent Publication 5: JP(A) 2010-180066

SUMMARY OF THE INVENTION

Objects of the Invention

An object of the invention is to provide a submicron-order scaly boron nitride fine particle having a low major diameter/thickness (aspect) ratio, high purity and high crystallinity.

EMBODIMENTS OF THE INVENTION

To achieve the aforesaid object, the present invention is embodied as follows.
(1) A boron nitride fine particle, characterized by having an average particle diameter of 0.05 to 2.0 μm, a graphitization index of 3 or less, and a total oxygen content of 0.20% by mass or less, with an average value of a major diameter/thickness ratio of scaly particles being 6.0 or less.

(2) A method of producing a boron nitride fine particle, characterized by introducing ammonia and an alkoxide borate at an ammonia/alkoxide borate molar ratio of 1 to 5 in a reaction vessel in an inert gas atmosphere for heating at 800 to 1,350° C. within 30 seconds thereby obtaining a boron nitride precursor, and then heating the boron nitride precursor at 1,650 to 2,200° C. for at least 0.5 hour in an inert gas atmosphere.

Advantages of the Invention

According to the invention, it is possible to obtain a submicron-order scaly boron nitride fine particle having a low major diameter/thickness (aspect) ratio, high purity and high crystallinity.

MODES FOR CARRYING OUT THE INVENTION

Figure 1:
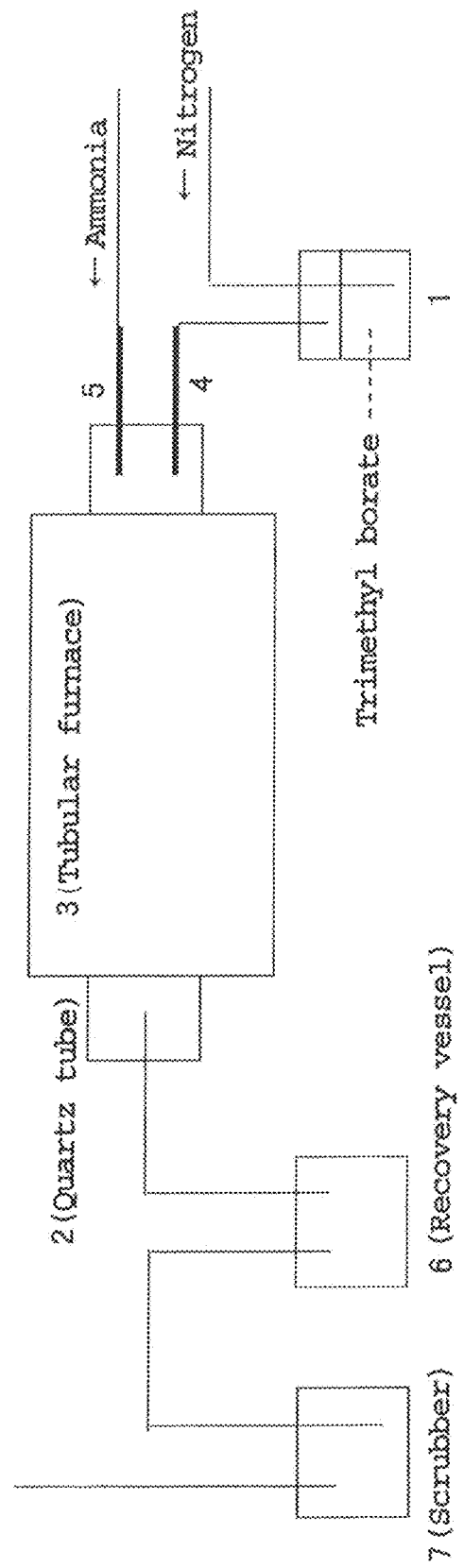
FIG. 1 is a schematic view of the apparatus of producing boron nitride fine particles.
Figure 2:
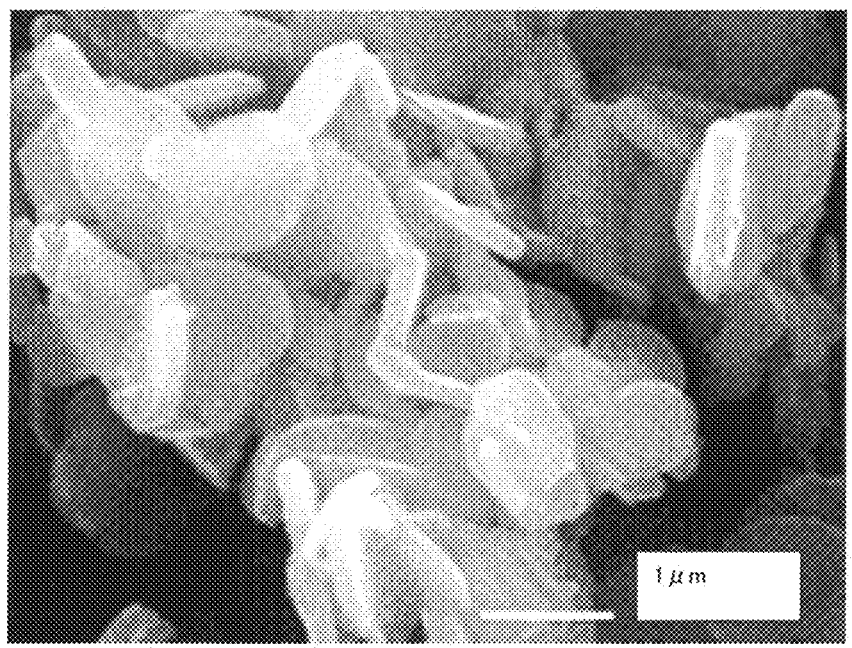
FIG. 2 is an electron micrograph of boron nitride fine particles according to the invention.

In the invention described herein, boron nitride fine particles are continuously synthesized from a volatilized alkoxide borate and ammonia by a so-called gas-phase reaction in an inert gas atmosphere.

It is here to be noted that unless otherwise specified, % is given on the mass basis.

The alkoxide borate used herein includes trimethyl borate, triethyl borate and tri-isopropyl borate, among which the trimethyl borate is preferred because of its high reactivity with ammonia and its availableness. The trimethyl borate is available as reagents from many companies in general, and in the form of a reagent under the trade name of "TMB" from Tama Chemicals Corporate.

While there is no particular limitation on the ammonia used herein, it is preferable to use a so-called impurity-free "high-purity" type.

While there is no particular limitation on the inert gas used herein, there is the mention of less chemical reactive gases, for instance, noble or rare gases such as helium, neon and argon, and nitrogen.

The boron nitride fine particles of the invention are continuously synthesized from the volatilized alkoxide borate and ammonia by the so-called gas-phase reaction. There is thus the need for an apparatus capable of continuous synthesis, and it is preferable to use the apparatus shown typically in FIG. 1.

The invention will now be explained with reference to the accompanying drawings.

An apparatus for producing the boron nitride fine particles of the invention is made up of a tubular furnace 3, a reaction (quartz) tube 2, a feeder vessel 1, an alkoxide borate inlet pipe 4, an ammonia gas inlet pipe 5, a sample recovery vessel 6, a scrubber 7, and so on.

While there is no particular limitation on the tubular furnace 3, it is preferable to use an easy-to-handle electric furnace.

An electric furnace operates on the basic principle that a heating element or the like forming a furnace generates heat by the passage of electric current for heating of the interior of the furnace, and is specialized in terms of heating modes and heating element materials. Generally, heating up to nearly 1,700° C. may be carried out in the resistance heating mode using a heating element, but for heating up to nearly 2,000° C. there is a coil induction heating mode in need.

By way of example but not by way of limitation, the heating element may be formed of a material such as silicon carbide or carbon.

Although there is no particular limitation on the material of the reaction tube 2 used herein, it is preferable to make use of alumina or quartz having chemical stability and good heat resistance.

Reference is here made to FIG. 1 that is a schematic view of the apparatus for producing boron nitride fine particles, in which a quartz tube is used as the reaction tube and trimethyl borate is used as the alkoxide borate.

The quartz tube 2 is placed in the tubular furnace 3 that is heated up to a given temperature. Then, trimethyl borate is placed in the feeder vessel 1 and introduced into the quartz tube 2 by way of the inlet pipe 4 in an atmosphere of nitrogen.

In the meantime, ammonia is also introduced into the quartz tube 2 by way of the inlet pipe 5. The introduced trimethyl borate and ammonia react with each other in the heated quartz tube 2, yielding a boron nitride precursor in the form of white powders (firing condition 1).

A part of the resulting boron nitride precursor adheres to the interior of the quartz tube, but the rest is all delivered to the recovery vessel 6 together with nitrogen and unreacted ammonia for recovery. Note here that nitrogen and unreacted ammonia are introduced into the scrubber 7 for detoxification.

The temperature of the tubular furnace 3 is 800 to 1,350° C. At lower than 800° C., the resultant boron nitride fine particles often come to have an average particle diameter of greater than 2.0 μm, and at higher than 1,350° C., the boron nitride fine particles often come to have a length/thickness ratio of greater than 6.0.

The reaction between trimethyl borate and ammonia gets done within 30 seconds. Exceeding 30 seconds may possibly cause the resultant boron nitride fine particles to have an average particle diameter of greater than 2.0 μm.

The ammonia and trimethyl borate are fed at an ammonia/trimethyl borate molar ratio of 1 to 5. As the molar ratio is less than 1, it is likely that the resultant boron nitride fine particles may have a total oxygen content of greater than 0.20%, and as that molar ratio is greater than 5, it is likely that the boron nitride fine particles may have an average particle diameter of less than 0.05 μm.

The feeding of trimethyl borate and ammonia is put off, and the tubular furnace 3 is powered off. The resultant boron nitride precursor in the form of white powders is placed in a boron nitride crucible, in which it is nitrided, yielding boron nitride fine particles.

The boron nitride fine particles are formed at an increased temperature of 1,650 to 2,200° C. in a high-frequency induction heating furnace in a nitrogen atmosphere (firing condition 2). At lower than 1,650° C. it is likely that the resultant boron nitride fine particles may have a graphitization index of greater than 3, and at higher than 2,200° C. it is likely that the resultant boron nitride fine particles may have an average particle diameter of greater than 2.0 μm or a length/thickness ratio of greater than 6.0.

The reaction time for the formation of boron nitride fine particles is at least 0.5 hour. In less than 0.5 hour, it is likely that the resultant boron nitride fine particles may have a graphitization index of greater than 3 or a total oxygen content of greater than 0.20%.

The boron nitride fine particles of the invention have an average particle diameter of 0.05 to 2.0 μm. Out of this range, there is poor dispersability in resins, failing to obtain smooth surfaces, or upon dispersed in a resin, there are hard spots appearing in the resin, making it less likely to keep the strength of the resin layer high.

The graphitization index of the boron nitride fine particles formed in the invention should be no greater than 3 so as to obtain lubrication capability and high thermal conductivity.

The total oxygen content of the boron nitride fine particles formed in the invention should be no greater than 0.20% so as to obtain lubrication capability and high thermal conductivity.

The major diameter/thickness ratio of the boron nitride fine particles formed in the invention should be no greater than 6.0 so as to obtain dispersability in resins.

EXAMPLES

The present invention will now be explained in further details with reference to experimental runs.

Experimental Run 1

The quartz tube 2 was placed in the tubular furnace 3 that was then heated to a given temperature. Trimethyl borate stored in the feeder vessel 1 was introduced into the quartz tube 2 through the inlet pipe 4 by way of nitrogen. In the meantime, ammonia was also introduced into the quartz tube 2 through the inlet pipe 5. The thus introduced trimethyl borate and ammonia reacted with each other in the heated quartz tube, yielding a boron nitride precursor in the form of white powers (firing condition 1). A part of the boron nitride precursor in the form of white powders adheres to the interior of the quartz tube, but the rest is all delivered to the recovery vessel 6 by way of nitrogen and ammonia. The boron nitride precursor that is the reaction product between trimethyl borate and ammonia is recovered in this vessel. Note here that nitrogen and unreacted ammonia are introduced into the scrubber 7 for detoxification.

The boron nitride precursor obtained in the form of white powders was placed in a boron nitride crucible, and fired in a high-frequency induction heating furnace at a given temperature in a nitrogen atmosphere to obtain the end boron nitride fine particles (firing condition 2).

In a specific example of the invention, firing up to 1,350° C. was carried out by an electric furnace in the resistance heating mode, and firing up to 1,650 to 2,200° C. was done by an electric furnace in the induction heating mode.

The obtained boron nitride fine particles were measured in terms of average particle diameter (APD), graphitization index (GI), total oxygen content (TOC) and major diameter/thickness ratio (MDTR). The results are set out in Table 1.

Materials Used
Trimethyl Borate ($C_3H_9BO_3$): Reagent Trimethoxy Borane made by Wako Pure Chemical Industries, Ltd.
Ammonia: Commercially available high-purity type
Measuring Methods The average particle diameter was measured using a laser diffraction/scattering particle size distribution analyzer made by Coulter and available under the trade name of LS-230.

For the graphitization index, an X-ray diffractometry apparatus (Geiger Flex 2013 Model) made by Rigaku Corporation was used in a range of 2θ=40°-53° to measure the integrated intensity ratio of diffraction lines in the vicinity of 2θ=41° (the plane (100)), 2θ=43° (the plane (101)), and 2θ=50° (the plane (102)). The orientation index was figured out from Graphitization Index=[Area {(100+(101))}]//[Area (102)].

The total oxygen content was measured using an oxygen/nitrogen co-analyzer (EMGA-620W/C made by HORIBA).

For the major diameter/thickness ratio, 100 particles arbitrarily selected from an electron micrograph image taken of boron nitride fine particles were measured in terms of major diameter and length using a ruler. The major diameter/thickness ratios were figured out from the measurements and the average value was defined as the major diameter/thickness ratio.

TABLE 1

| Run No. | $NH_3/C_3H_9BO_3$ (molar ratio) | Firing Cond. 1 (° C.) | Firing Cond. 1 (sec.) | Firing Cond. 2 (° C.) | Firing Cond. 2 (hr.) |
|---|---|---|---|---|---|
| 1-1 | 0.8 | 1,000 | 10 | 2,000 | 4 |
| 1-2 | 1.2 | 1,000 | 10 | 2,000 | 4 |
| 1-3 | 3.5 | 1,000 | 10 | 2,000 | 4 |
| 1-4 | 4.9 | 1,000 | 10 | 2,000 | 4 |
| 1-5 | 5.4 | 1,000 | 10 | 2,000 | 4 |
| 1-6 | 3.5 | 780 | 10 | 2,000 | 4 |
| 1-7 | 3.5 | 800 | 10 | 2,000 | 4 |
| 1-8 | 3.5 | 1,350 | 10 | 2,000 | 4 |
| 1-9 | 3.5 | 1,380 | 10 | 2,000 | 4 |
| 1-10 | 3.5 | 1,000 | 25 | 2,000 | 4 |
| 1-11 | 3.5 | 1,000 | 40 | 2,000 | 4 |
| 1-12 | 3.5 | 1,000 | 10 | 1,600 | 4 |
| 1-13 | 3.5 | 1,000 | 10 | 1,650 | 4 |
| 1-14 | 3.5 | 1,000 | 10 | 2,150 | 4 |
| 1-15 | 3.5 | 1,000 | 10 | 2,230 | 4 |
| 1-16 | 3.5 | 1,000 | 10 | 2,000 | 0.4 |
| 1-17 | 3.5 | 1,000 | 10 | 2,000 | 0.8 |

| Run No. | APD (μm) | GI | TOC (%) | MDTR | Remarks |
|---|---|---|---|---|---|
| 1-1 | 0.9 | 1.8 | 0.25 | 5.2 | Comparative |
| 1-2 | 0.8 | 1.8 | 0.15 | 5.3 | Inventive |
| 1-3 | 0.8 | 2.0 | 0.10 | 4.8 | Inventive |
| 1-4 | 0.1 | 2.0 | 0.05 | 5.0 | Inventive |
| 1-5 | 0.04 | 2.2 | 0.06 | 5.8 | Comparative |
| 1-6 | 2.2 | 2.4 | 0.16 | 5.9 | Comparative |
| 1-7 | 2.0 | 2.2 | 0.07 | 5.8 | Inventive |
| 1-8 | 0.8 | 1.9 | 0.04 | 5.7 | Inventive |
| 1-9 | 0.9 | 2.0 | 0.08 | 6.2 | Comparative |
| 1-10 | 2.0 | 1.7 | 0.06 | 5.9 | Inventive |
| 1-11 | 2.3 | 1.9 | 0.10 | 6.0 | Comparative |
| 1-12 | 0.8 | 4.0 | 0.18 | 4.3 | Comparative |
| 1-13 | 0.8 | 2.9 | 0.17 | 4.5 | Inventive |
| 1-14 | 1.0 | 1.7 | 0.03 | 5.9 | Inventive |
| 1-15 | 1.3 | 1.5 | 0.03 | 6.2 | Comparative |
| 1-16 | 0.7 | 4.5 | 0.50 | 3.0 | Comparative |
| 1-17 | 0.8 | 3.0 | 0.18 | 4.9 | Inventive |

EXPLANATION OF THE REFERENCE NUMERALS

1: Vessel
2: Reaction tube (quartz tube)
3: Tubular furnace
4: Alkoxide borate inlet pipe
5: Ammonia gas inlet pipe
6: Recovery vessel
7: Scrubber

What is claimed is:
1. A boron nitride fine scaly particle,
having an average particle diameter of 0.05 to 2.0 μm, a graphitization index of 3 or less, a total oxygen content of 0.20% by mass or less, and an average value of a major diameter/thickness ratio of 6.0 or less.

2. A method of producing the boron nitride fine scaly particle of claim 1, characterized by introducing ammonia and an alkoxide borate at an ammonia/alkoxide borate molar ratio of 1 to 5 in a reaction vessel in an inert gas atmosphere for heating at 800 to 1,350° C. within 30 seconds thereby obtaining a boron nitride precursor, and then heating the boron nitride precursor at 1,650 to 2,200° C. for at least 0.5 hour in an inert gas atmosphere.

* * * * *